United States Patent [19]

Negri et al.

[11] Patent Number: 4,743,475
[45] Date of Patent: May 10, 1988

[54] DRYWALL COATING COMPOSITION

[75] Inventors: Robert H. Negri, Palatine; Peter M. Attard, Elk Grove, both of Ill.

[73] Assignee: United States Gypsum Company, Chicago, Ill.

[21] Appl. No.: 12,493

[22] Filed: Feb. 9, 1987

[51] Int. Cl.$^4$ .......................... C08K 3/34; B05D 3/02
[52] U.S. Cl. ................................. 427/387; 427/391; 524/43; 524/44; 524/427; 524/447; 524/449
[58] Field of Search ................... 524/43, 44, 427, 447; 427/387, 391

[56] References Cited

U.S. PATENT DOCUMENTS

| Re. 29,753 | 9/1978 | Williams | 106/85 |
|---|---|---|---|
| 3,793,269 | 2/1974 | Bruschter et al. | 524/44 |
| 3,835,074 | 9/1974 | Desmarais | 524/44 |
| 3,844,990 | 10/1974 | Lindemarr et al. | 524/44 |
| 3,891,582 | 6/1975 | Desmarais | 524/44 |
| 3,900,434 | 8/1975 | Bruschter et al. | 524/44 |
| 4,039,492 | 8/1977 | Hamilton | 524/44 |
| 4,454,267 | 6/1984 | Williams | 524/44 |

FOREIGN PATENT DOCUMENTS 118637  9/1984  European Pat. Off. .............. 524/44

OTHER PUBLICATIONS

Sweet's Catalog, 9P, "Skim Coating in Drywall Finishing", United States Gypsum Company 1985.
Sweet's Catalog, 9, "Recommended Specifications for the Application and Finishing of Gypsum Board", pp. 14–15, Gypsum Association, 1985.
"Bermocoll in Latex Paints" brochure, Berol Kemi AB; 1983.
"Minex Extender Pigment" brochure; no pagination, Indusmin, Ltd., undated.
"Airflex" RP-245 leaflet, Air Products and Chemicals, Inc.; 1984.

Primary Examiner—Lewis T. Jacobs
Assistant Examiner—David W. Woodward
Attorney, Agent, or Firm—Robert M. Didrick; Robert H. Robinson

[57] ABSTRACT

The unequal porosity and different textures of a drywall reinforced with joint tape and joint compound are concealed by a paint made from a low cost, easily dispersible powder in which the pigment volume concentration is about 70% to about 75%. A vinyl acetate/ethylene copolymer serves as the principle binder and a water soluble cellulose ether thickens the water dispersion of kaolin, attapulgus clay, mica, sodium potassium aluminum silicate and calcium carbonate.

9 Claims, No Drawings

DRYWALL COATING COMPOSITION

This invention relates to the problem of painting a wall newly erected by fastening gypsum drywall panels to a framework, taping the seams, covering the tape and fastener dimples with joint compound and then smoothing the surface. The invention relates more particularly to an easily dispersible powder for making a water based paint which, as a first coat, will conceal the differences in the textures of the drywall face paper and the joint compound and also equalize the porosities of the paper and the joint compound.

The problem of "joint banding" or "photographing" when decorating a drywall with a gloss or semi-gloss paint remains a concern for the industry. Raised paper fibers, caused by the inadvertent roughening of the drywall paper when sanding the joint compound, are difficult to hide. Unless the differences between the porosities and surface textures of the face paper and the joint compound are concealed beforehand, the glossy coating will reveal all the irregularities of the underlying wall.

One of the methods recommended by joint compound suppliers for overcoming the joint banding problem is to apply a skim coat of the joint compound over the entire surface of the newly erected wall. Thus, the porosity and texture presented to the glossy paint is that of the joint compound. In skim coating the joint compound is slightly thinned out with water and applied with a trowel or a broadknife, or with a long nap roller followed by troweling. Loss of joint compound as droppings during application and smoothing is almost inevitable. The skim coat of joint compound does not provide sufficient "hold out" to prevent the penetration of water or solvent from the finish coat of paint. Thus, the suppliers of joint compound recommend a primer and sealer over the skim coat.

Ready mixed compositions are often packaged and promoted as combination primers/sealers. A sealer should have a resin content high enough to lay down a film which provides good "hold out" to both the face paper and joint compound surfaces. Sealers usually do not have adequate amounts and kinds of pigments and fillers to build up the film so that texture differences are concealed. Primers are primarily designed for the latter purpose but some do contain enough resin to equalize porosity. The cost of providing adequate resin along with the adequate amounts and proper types of pigments and fillers to do both jobs, when added to the cost of large scale dispersing equipment and the cost of transporting water-heavy compositions results in prices of about $8.00 or more per gallon to the contractor. A low cost alternative which imparts equal or superior properties to the drywall is thus very desirable.

Flat paints are the most commonly used undercoating compositions even though they contain lesser amounts of resin than do the ready mixed primer/sealer combinations.

There still remains, however, a need for a low cost method for preparing a newly erected drywall so that the occupants of a room cannot tell where the joint compound and raised paper fibers are after decoration with a gloss or semi-gloss paint.

The coating composition used in such a method is the key to the cost savings in that its cost as supplied to the contractor must be low and the cost of preparing and applying the composition must not negate the initial low cost. As may be seen from the above, a high quality undercoating composition for drywall should have a high resin content for sealing the pores of both the joint compound and the face paper and also a high pigment/filler content for building up the film in order to conceal the varying textures of the joint compound, smooth face paper and roughened face paper. But, the nature of the various resins, pigments and fillers must be taken into account when they are to be combined as a dry powder for sale to contractors who then will choose to disperse the powder in local tap water at the job site. The contractor wants to get thorough dispersion in as little time as possible. Some contractors prefer to spray the undercoating and cannot abide poorly dispersed paint. Thus, the components of the dry powder must be selected and combined in proportions designed to maximize the dispersibility of the dry powder while providing good film build up properties to the water-based paint and high hiding power along with good "hold out" properties and hardness to the dried film of paint.

It is an object of this invention, therefore, to provide an easily dispersible dry powder for use in making a water based undercoat paint for drywall at the job site.

It is a related object of this invention to provide a low cost method for equalizing the porosities and concealing the differences in texture of a drywall having joint compound at its seams and fasteners.

It is yet another object of this invention to provide a method for applying a thick undercoating film on a drywall which is sufficiently smooth without sanding for decoration with a finish coat to give a pleasingly fine texture.

It is a further related object of this invention to provide a low cost undercoating composition for newly erected drywall which is equal or superior to high cost, ready-mixed primer/sealer compositions in its ability to provide for a monolithic appearance of the wall when finished with a gloss or semi-gloss paint.

These and other objects of this invention which will become apparent are achieved by a powder consisting essentially of, on a weight basis:

from about 16% to about 24% calcium carbonate,
from about 20% to about 30% kaolin,
from about 3% to about 5% attapulgus clay,
from about 8% to about 12% mica,
from about 16% to about 24% sodium potassium aluminum silicate,
from about 4.5% to about 10% vinyl acetate/ethylene copolymer,
from about 1% to about 3% of a water soluble cellulose ether,
and a dispersant.

The calcium carbonate is a very finely divided filler having a mean particle size of about 0.7 micron. Preferably, about 90% of the particles are smaller than 2 microns. The powder of this invention preferably contains from about 18% to about 22% of the calcium carbonate; a particularly preferred powder contains about 20% of this filler by weight.

A rather large amount of the kaolin is used despite its high oil absorption value of 40 to 42 because it has good hiding power and is easily dispersible in water. Titanium dioxide, being a true pigment rather than an extender or filler, has much greater hiding power and a much lower oil demand (about 20) but it is difficult to disperse in water. The dry powder preferably contains from about 23% to about 28% of the kaolin by weight and more preferably from about 25 to about 28%. It is preferred that about 96% by weight of the kaolin particles are smaller than 10 microns and at least about 20% of them are smaller than 1 micron.

Because the extenders and fillers do not opacify the film deposited on the drywall according to this invention, the worker who applies the coating may have difficulty in distinguishing the coated area of the drywall from the non-coated area. For that reason, a true pigment such as titanium dioxide which does opacify or a dispersible colorant of some kind may be added to the dry powder. When using titanium dioxide, the amount may be up to about 10%, preferably up to about 8%, of the total weight of the powder.

The levelling properties of the water based paint are such that the undercoated drywall will have a smooth surface ready for finish coating without sanding being necessary even when the undercoating is applied with a roller. The attapulgus clay and the cellulose ether work together to impart such desirable levelling properties. Attapulgus clay is known to impart non-levelling properties to water based coating materials and its presence helps to make possible a thick, non-sagging undercoat on the drywall. The viscosity at low shear rates imparted to the water based paint by the water soluble cellulose ether balances the effect of the attapulgus clay as to the levelling properties of the paint. The viscosity at high shear rates affects the thickness of the film that can be applied on each stroke of a roller or each pass of a spray gun.

A water soluble cellulose ether is, for the purposes of this invention, one which forms a transparent colloidal solution in water at a concentration of about 6% by weight of the solution. A 2% aqueous solution of the cellulose ether of this invention has a viscosity of from about 5000 to about 50,000 cps at a shear rate of 2 reciprocal seconds as measured with a Brookfield viscometer type LV. At a shear rate of 10,000 sec$^{-1}$, a 2% solution of the ether has a viscosity of from about 50 to about 90 cps. The cellulose backbone of the ether has from about 100 to about 1200 anhydroglucose units. A hydroxyalkyl cellulose and particularly, an alkyl hydroxyalkyl cellulose, is preferred. An ethyl hydroxyethyl cellulose is preferred among the latter types and one in which there are an average of about two hydroxyethyl groups on each anhydroglucose unit is especially preferred. The cellulose ether preferably amounts to from about 1.5% to about 2.5% of the weight of the dry powder and a particularly preferred amount is 2%. A preferred amount of the attapulgus clay, on the other hand, is from about 3% to about 4%, the latter being more preferable.

The mica platelets help to hide the varying textures of the drywall paper and joint compound. The mean particle size of the platelets is from about 20 to about 25 microns. A preferred powder of this invention contains about 10% mica.

The sodium potassium aluminum silicate is a non-argillaceous mineral which acts as an extender pigment. Unlike the rather soft mica platelets, the irregular nodules of this mineral are relatively hard (5.5–6 on the Mohs scale). Thus, although sanding of the undercoating film is not necessary for a satisfactory smoothness, this extender imparts a hardness to the film so that if light sanding is done the integrity of the film will not be disturbed. The mean particle size of the nodules is 4.5 microns and the largest nodules are about 17 microns, as determined by the sedimentation method. It has an oil absorption value of 28 to 29. A preferred amount of this alkali aluminum silicate is from about 18% to about 22% of the weight of the dry powder. About 20% is especially preferred.

The primary binder in this system is a vinyl acetate/ethylene copolymer in which the ethylene portion is from about 10% to about 30% of the weight. It is in the form of a redispersible powder whose predominant particle size is in the 1–5 micron range with only about 2% of the particles being larger than 40 mesh. It forms a tough film which adheres well to the drywall and to the fillers and pigments of the coating composition. Preferably, the dry powder of this invention contains from about 6 to about 8% of the copolymer.

Overpigmentation of a coating composition can lead to loss of adhesion especially when one or more of the pigments or extenders has a high oil absorption value. Pigment volume concentration, commonly called the PVC, is the ratio of the volume of the pigment, including extenders and fillers, to the total volume of non-volatile components (i.e., pigment and vehicle). In this invention, the volume of the binder plus the thickener and the miscellaneous additives such as defoamers, dispersants and preservatives is less than half of the volume of the pigment. The adhesion of the undercoating film to the drywall is very good despite the fact that the PVC is from about 70% to about 75%.

The dry powder may be dispersed easily and quickly in water by a painter at the job site. A hand-held mixer powered by a ¾ inch drill motor and equipped with a cage type paddle or similar paddle is well suited to the job. It is preferred that the initial proportion of powder to water is about 10 pounds per gallon and that the powder is stirred into the water at a mixer speed of about 550 r.p.m. until the mixture becomes lump free. After soaking of the mixture for from about 5 to about 10 minutes, stirring is resumed and up to about 1.6 gallons of water per 10 pounds of powder is added to obtain the desired consistency. The water content of the paint may be from about 60% to about 70% by weight or 75–85% by volume. The paint may be sprayed, brushed, or rolled onto the drywall without further delay although the customary practice of straining the paint through a sock or the like before putting it into the spray gun may be followed if desired. Usually, the wet thickness of the coating so applied is about 4 mils or more and it may be up to about 12 mils without runs or sags.

The following examples illustrate the invention more specifically and are not intended to be limiting.

EXAMPLE 1

A dry powder was prepared according to the following formula:

| Ingredient | Weight Percent |
| --- | --- |
| Calcium carbonate | 20.0 |
| Calcined kaolin | 25.0 |
| Attapulgus clay | 4.0 |
| Titanium dioxide | 8.0 |
| Mica | 10.0 |
| Sodium potassium aluminum silicate | 20.2 |
| Vinyl acetate/ethylene copolymer | 8.0 |
| Ethyl hydroxyethyl cellulose | 2.0 |
| Defoamer (Nopco PD-1) | 2.0 |
| Dispersant (Daxad 30S) | 0.7 |
| Fungicide (Vancide MZ-96) | 0.1 |

The calcium carbonate was the high purity, ultrafine product sold by Omya, Inc. under its trademark Omyacarb. Its bulking value is 0.0444 gallon per pound.

The calcined kaolin used was the product sold under the trademark Snow-Tex 45 by the Texas Industrial Minerals Company. Its bulking value is 0.0465 gallon per pound and its oil absorption value is 40–42 lbs. per 100 lbs. by the spatula rub out method of ASTM D-281-31.

The attapulgus clay was Attagel M-8214 from Engelhard Minerals and Chemical Co. Its bulking value is 0.0508 gallon per pound.

The titanium dioxide was the rutile type sold by American Cyanamid under its Unitane OR-600 trademark. Its bulking value is 0.0293 gallon per pound.

The mica has a bulking value of 0.0418 gallon per pound. Sold by United States Gypsum Company under the designation P80F-K, its mean particle size is 22.8 microns, as determined by Stokes sedimentation by sedigraph, and 97.5% by weight is smaller than 150 microns.

The sodium potassium aluminum silicate is available from Indusmin, Ltd. under its trademark Minex 7. It has a bulking value of 0.0459 gallon per pound.

The vinyl acetate/ethylene copolymer used was a redispersible powder sold by Air Products and Chemicals, Inc. under its trademark Airflex RP-245 which contains about 10% each of an inert filler and polyvinyl alcohol by weight. Thus, the copolymer itself, constituted about 6.4% of the powder of this example. The bulking value of the RP-245 powder is 0.1091.

The ethyl hydroxyethyl cellulose was the Bermocoll E-351 water soluble cellulose ether sold in powder form by Berol Kemi AB. The average number of hydroxyl groups in each anhydroglucose unit that have been replaced by hydroxyethyl groups is 2 and the average number of ethyl substituents per unit is 0.9. The Brookfield viscosity of a 2% aqueous solution at 20° C. is from 4000 to 6000 cps as measured with a type LV viscometer and No. 3 spindle at a speed setting of 12. With a specific gravity of 1.33, the bulking value of the cellulose ether is 0.0903 gallon per pound.

The powder of this example, having a pigment volume concentration of 74.6% as calculated from the bulking values, was added to water with stirring in the proportion of 25 pounds of powder to 2.5 gallons of water. A cage type paddle mixer driven by a ¾ inch drill motor at 550 r.p.m. was used to disperse the powder in the water. The thick, lump-free slurry was then diluted with 4 gallons of water. The resulting paint was ready to use about 15 minutes after the powder was first added to the water. It was strained through a sock in keeping with standard practice before being sprayed through an airless spray gun having a 0.019 inch atomizing tip onto a newly erected drywall having joint tape and joint compound at the seams between each panel. The result was a monolithic undercoat with no joint flashing visible under critical lighting. The wall was painted with a finish coat later without sanding the undercoat.

EXAMPLE 2

The procedure of Example 1 was followed generally except that the paint was applied with a roller with similarly good results.

The subject matter claimed is:

1. A method for equalizing the porosity and concealing differences in texture of a joint compound reinforced drywall comprising blending a dry powder consisting essentially of:
    from about 16% to about 24% calcium carbonate,
    from about 20% to about 30% kaolin,
    from about 3% to about 5% attapulgus clay,
    from about 8% to about 12% mica,
    from about 16% to about 24% sodium potassium aluminum silicate,
    from about 4.5% to about 10% vinyl acetate/ethylene copolymer,
    from about 1% to about 3% of a water soluble cellulose ether,
    a 2% aqueous solution of which has a viscosity of from about 5000 to about 50,000 cps at a shear rate of 2 $sec^{-1}$ and a viscosity of from about 50 to about 90 cps at a shear rate of 10,000 $sec^{-1}$;
    and a dispersant;
dispersing the dry powder in a sufficient amount of water to make a paint containing from about 60% to about 70% water by weight, and coating the drywall with the paint.

2. The method of claim 1 wherein the dispersing step is completed in about 15 minutes.

3. The method of claim 1 wherein the coating step is commenced promptly after the dispersing step is completed.

4. The method of claim 1 wherein the kaolin is about 25% of the weight of the dry powder.

5. The method of claim 1 wherein the silicate is aboout 20% and the mica is about 10% of the weight of the dry powder.

6. The method of claim 1 wherein the copolymer is from about 6% to about 8% and the attapulgus clay is about 4% of the weight of the dry powder.

7. The method of claim 6 wherein the cellulose ether is an alkyl hydroxyalkyl cellulose.

8. The method of claim 7 wherein the cellulose ether is ethyl hydroxyethyl cellulose.

9. The method of claim 1 wherein the powder further contains up to about 10% of an opacifying pigment.

* * * * *